US007520808B1

(12) United States Patent
Wolf

(10) Patent No.: US 7,520,808 B1
(45) Date of Patent: Apr. 21, 2009

(54) LOTTERY GAME

(76) Inventor: David Wolf, 67 Brackett Rd., Newton, MA (US) 02458

( * ) Notice: Subject to any disclaimer, the term of this patent is extended or adjusted under 35 U.S.C. 154(b) by 739 days.

(21) Appl. No.: 10/868,324

(22) Filed: Jun. 15, 2004

Related U.S. Application Data

(60) Provisional application No. 60/490,831, filed on Jul. 30, 2003, provisional application No. 60/480,592, filed on Jun. 20, 2003.

(51) Int. Cl.
*G06F 17/00* (2006.01)

(52) U.S. Cl. .......................................................... 463/17

(58) Field of Classification Search ............. 463/16–21, 463/22; 273/269, 274, 138.1, 139
See application file for complete search history.

(56) References Cited

U.S. PATENT DOCUMENTS 6,017,032 A * 1/2000 Grippo et al. ............ 273/138.1
6,277,026 B1 * 8/2001 Archer ........................ 463/42
6,322,446 B1 * 11/2001 Yacenda ...................... 463/16
6,648,755 B1 * 11/2003 Luciano et al. ............... 463/17
6,767,284 B1 * 7/2004 Koza .......................... 463/29
6,887,152 B2 * 5/2005 Stanek ........................ 463/17
7,374,483 B2 * 5/2008 Wiltshire et al. .............. 463/17
2001/0031661 A1 * 10/2001 Wiltshire et al. .............. 463/26
2002/0006821 A1 * 1/2002 Park ........................... 463/17
2003/0207708 A1 * 11/2003 Sadri et al. .................... 463/17

* cited by examiner

*Primary Examiner*—Ronald Laneau
(74) *Attorney, Agent, or Firm*—Wolf, Greenfield & Sacks, P.C.

(57) ABSTRACT

An online lottery game having periodic drawings of a series of digits. Money derived from the sale of lottery tickets is allocated into a plurality of winning pools in which the winning pool consisting of all of the numbers is smaller than at least one and preferably all of the other winning pools consisting of less than all of the numbers. Money allocated to pools are carried forward to successive drawings in the event there are no winners of that particular pool.

12 Claims, 4 Drawing Sheets

LOTTERY GAME

RELATED APPLICATIONS

The present invention relates to a lottery game and is a continuation in part of an Application Ser. No. 60/480,592 filed on Jun. 20, 2003 and Application Ser. No. 60/490,831 filed on Jul. 30, 2003.

SUBJECT MATTER OF THE INVENTION

Current interest in lottery games have resulted in a wide range of publicly promoted games conducted throughout the United States and elsewhere. These games take several forms including the well-known scratch card games in which winning numbers are determined by scratching off a covering layer on cards to disclose the winning numbers. Another form of public lottery involves pre-sold tickets bearing number combinations, with the winning number combinations selected periodically from a pool of money derived from ticket sales. The present invention is directed primarily to the latter type of game. This game is ordinarily characterized as an online game to distinguish it from games that involve scratch tickets.

The online lottery game has become popular throughout the country by virtue of the very large jackpots that build up over a time period. These jackpots grow, in large measure because the odds of winning multiple number combinations are relatively small. For example, in a recent Powerball game, the chances of winning the jackpot were in the order of 1 in 120 million. Conventionally, in these games, if the winning number is not picked, the money pool or a portion of it, derived from ticket sales, is held over and added to the next drawing, so that the winning pool gets larger with each successive drawing in which there is no winner. Obviously when no one wins the pool for a number of weeks, the amount of money in the pool grows. As it grows, the public interest in the increasingly valuable pool also grows.

To maintain a continuing interest in these games, prizes are awarded for picking fewer than all of the required numbers needed to win the large major prize. Thus, in many instances, when there is no winner of the major prize for weeks or even months, smaller awards may be regularly made. For example, in a six number lottery, picking all six is required to win the major prize, but selecting, for example, four of the six will result in lesser awards. Typically these consolation awards may reach $100,000, while the major or grand prize grows with each drawing in which there is no grand prize winner.

One drawback with these games is that the major prize is usually won in a matter of 3 to 12 weeks, thus limiting the interest in the game, since once the major or grand prize is won, the game starts over again and it takes a number of drawings before the major pool grows to a size that attracts a significant number of players.

Another concern with certain types of online games is that the online drawing is frequently watched by a large television audience. There is always an interest in maintaining as much interest in the drawing process as possible so as to permit individuals playing the game to remain in suspense until winning numbers are drawn.

The present invention provides, in several embodiments, a methodology for maintaining at least partial interest in the drawing process during the selection of all the winning combination numbers.

The present invention is designed to provide an improved lottery game in which some of the money derived from ticket sales in each of a series of selling periods is allocated into a plurality of pools, with the allocation in one pool being much smaller than at least one other pool and preferably all the other pools. The tickets sold with each bearing a sequence of numbers arranged in a series of separate groups. The winners, if any, of the pools are determined by a drawing of a winning number combination at the end of each selling period. The winners, if any, in the one pool is determined by all the winning number combination. The winners, if any, of the other pools are determined by groups of the winning number combination. Thus, a ticket bearing the numbers only in the first of the series of groups is a winner of one of the other pools. Similarly, a ticket bearing the numbers in successive groups, but less than all, is also a winner of one of the other pools. The invention further contemplates allowing the winners, if any, of the one pool, the option of selecting an award equal to the money in any other pool, and further contemplates provisions for allowing ticket holders, at periodic drawings, to substitute one or more numbers for those previously selected in their tickets.

The present invention is thus designed to provide an improved lottery game in which significant prizes may be awarded with regularity, but in which a much larger prize builds more slowly over time, with the odds of winning the largest prize less than in most games, and in which the relative size of the more frequently awarded prizes is sufficiently significant to attract the regular attention of lottery players.

DESCRIPTION OF FIGURES

The present invention will be more clearly understood in conjunction with the accompanying drawings in which.

DETAILED DESCRIPTION OF INVENTION

The present invention contemplates the use of pre-selected segments of a larger group or sequence of numbers that must be selected to win money in selected pools. Two or more pools are available for winners in the lottery. The prizes, however, vary in size and are determined by assigning to the various prize pools different percentages of the money allocated as prize money from ticket sales. Key to this arrangement is the assignment of a smaller percentage of the allocated prize money to the winning number combination with the smallest odds of winning than to segments of the winning number combinations with greater odds of winning in each successive selling period.

The following describes a specific embodiment of this invention, but the principles involved may be applicable to different sequences of numbers, as well as to different sized segments of numbers and to variations on the percentages of money allocated from the lottery prize pool.

Figure 1:
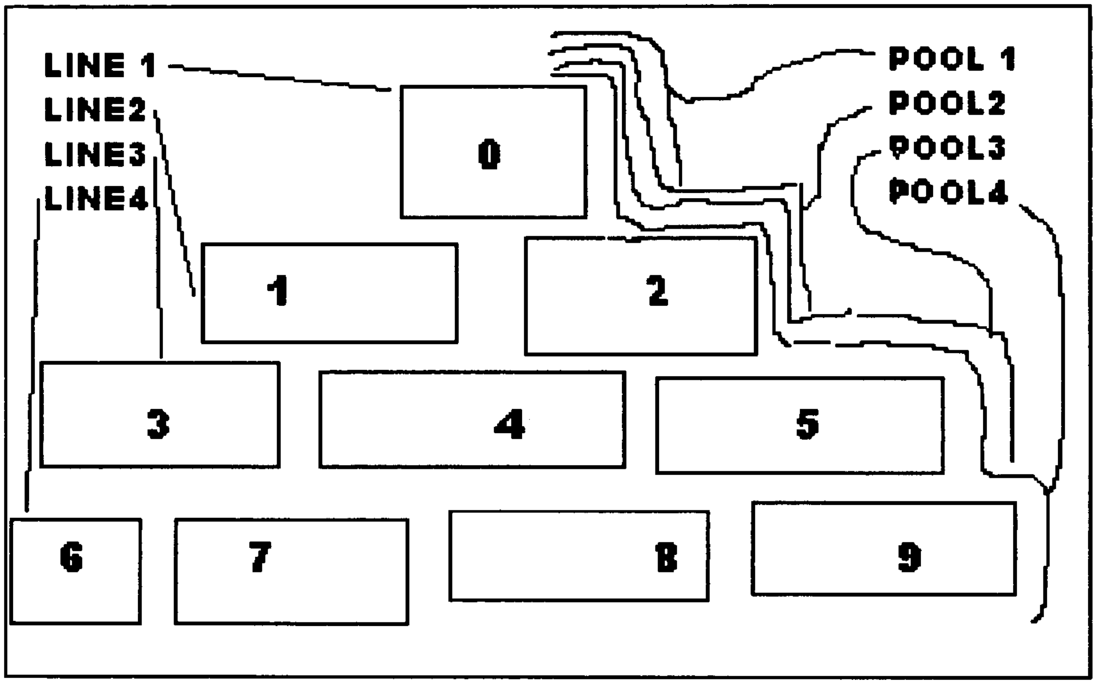
FIG. 1 is a lottery ticket embodying in part the present invention.

In FIG. 1, there is illustrated a lottery ticket having imprinted thereon a pyramid display of four lines identified as line 1, line 2, line 3, and line 4. "Lines" as referred to herein may also be referred to as "groups." The lottery ticket may be otherwise printed and sized similarly to conventional lottery tickets with conventional security and numbering indicia that does not form part of this invention. In this embodiment, line or group 1 has a single number, line or group 2 has two numbers, line or group 3 has three numbers, and line or group 4 has four numbers. In the preferred embodiment each of these numbers is a digit from 0 to 9. As many tickets as possible are sold during a periodic selling period, which may, typically, be one week in a system that allows each player to select any ten digit combination in this array for imprinting on the ticket. In the lottery, the winning number combination consisting of ten digits is drawn at the end of each of a series of successive selling periods in which the lottery tickets are sold. If the ten digit winning number combination was 0, 1, 2, 3, 4, 5, 6, 7, 8 and 9 and was selected in that order, they would be arranged in the pyramid with "0" being in line one; "1" and "2" in line 2; "3,", "4" and "5" in line 3; and "6," "7," "8" and "9" in line 4. In this particular game, anyone having the number "0123456789," in that order, would be a grand prize winner or "Pool #4" winner. In addition, if someone selected the numbers "0" for line 1; "12" for line 2; "3 4 5" for line 3; and "0000" for line 4, the player would not have identified all numbers of the winning number combination, but in this lottery game the player would nonetheless be considered a winner, which for identification may be characterized as a "Pool #3" winner because the player selected the correct number sequence for lines or groups 1 to 3. Similarly, if the numbers drawn in the draw period were numbers "0" in line 1; "1 2" in line 2; and "300" in line 3; and "0000" in line 4, a person holding a ticket with the numbers zero to nine, as set forth above, would not be either a grand prize winner or a Pool #3 winner, but for purposes of this embodiment, the person would be considered a Pool #2 winner, having selected the correct sequence for the first two lines. If someone drew number zero in line 1 and each other number was "1," the contestant would be a Pool #1 winner.

The money derived from sale of lottery tickets in each selling period is allocated among the various pools. Thus, for example, the money may be divided among Pools 1, 2 and 3, and Pool 4. Alternately, the money may be divided among Pools 2 and 3 and the Pool 4 with prize Pool 1 being rewarded with a fixed sum award such as a dollar or with free tickets only. The allocation of money to these various pools will depend in large measure upon the lottery's various objectives which may vary from lottery to lottery. Typically, a lottery selling period may take place once a week. If, for example, $2,000,000 worth of tickets are sold at $1.00/ticket, the lottery administrators will determine what portion of the gross sum of $2,000,000 will be allocated to prize money. Typically, the money derived is split between the lottery money and other allocations such as overhead and other purposes such as grants to cities and towns. If, for example, it is determined that 50% of the lottery sum needs to be awarded as prize money, in this case $1,000,000 would be allocated among the various pools. If, for example, in this instance, the lottery administrators determined that Pool 1 would have no money, but winners of Pool 1 will be rewarded with a free ticket or tickets, the balance of $1,000,000 would then be allocated among Pools 2, 3 and 4. The allocation may vary considerably, but in allocating money in this invention, the Pool 4 allocation for the particular selling period would be small compared to the money allocated among Pools 2 and 3. Thus, for example, in the example given, Pool 2 may have a pre-selected allocation of 10% or $100,000 of the $1,000,000. Pool 3 will have a pre-selected allocation of 85% or $850,000 while the Pool 4 will have a pre-selected allocation of 5% or $50,000. These allocations may vary, but the allocation to Pool 4 should be smaller than at least one and preferably all the other pool allocations.

In administering this lottery game from selling period to selling period, the pools are separately administered. Thus, in the case given, lottery tickets may be awarded for winners of Pool 1 each week or selling period. If there are no winners in Pool 2, the money or a pre-selected percentage of it will carry forward to the next week. Alternatively, if there are one or more winners of Pool 2, the money allocated to Pool 2 would be divided among the winners of that Pool. Thus, in the illustrative example, if there is one winner, that winner would receive $100,000 and Pool 2 would be empty until sales take place in the next selling period. If there were, for example, four winners of Pool 1, the $100,000 money allocated in this example would be split in four ways or $25,000 for each winner and the pool would, as noted above, be empty for that selling period. Similarly, with respect to Pool 3, if there is no winner, the $850,000 allocated to the pool would carry over to the next week as would the Pool 4 if there were no winners of that pool. If, on the other hand, there were one or more winners of Pool 3, the money would be appropriately allocated among the winners and Pool 3 would be empty for replenishment in the next selling period. A similar procedure would be followed for the Pool 4.

The likelihood of a winner of the Pool 4 in any given selling period is very small and a great deal smaller than the likelihood of winning pool 2 or 3. Accordingly, it is likely that there will be no winners of the Pool 4 for many months, during which time that pool will build up to a point where it becomes much larger than any of the other pools which will likely be emptied with much greater regularity. However, in the unlikely event that there is a Pool 4 winner, when the total dollar volume allocated to the Pool 4 is smaller than the money allocated to either Pools 2 or 3, the invention contemplates permitting the Pool 4 winner to elect to substitute or switch pools with either pools 2 or 3. Thus, for example, if in the first week there was a grand pool winner, the grand pool winner could, on election, elect to switch the pool money of either Pool 3 or Pool 4, thus receiving $850,000 while the winners of Pool 3 would have to split the $50,000 that earlier would have been awarded to the Pool 4. A further alternative, and perhaps a more preferred embodiment of this invention contemplates awarding a Pool 4 winner, a sum at least equal to the Pool 3 amount if the total amount allocated to Pool 4 is not yet equal to the pool amount in Pool 3. Thus, for example, if after the first week Pool 3 has an allocated $850,000 and Pool 4 has an allocated $50,000 and there is a single winner in Pool 4 and perhaps several in Pool 3, the lottery administration would automatically award the single winner of Pool 4 an amount equal to the total of Pool 3. This would mean in the example discussed that the lottery administrators would have to pay $850,000 to the Pool 4 winner. If the overall revenue from the pool was $2,000,000 of which 50% was originally scheduled to be apportioned among winners, the lottery administration would necessarily have to allocate a further $800,000 ($850,000 awarded to the Pool 4 winner minus the $50,000 originally allocated to that pool). This would mean the lottery administrators would, in that instance, only be able to allocate $200,000 to other purposes including administration and charitable purposes, etc. Since the risk of this happening is fairly small, it is a risk that may be considered in the overall scheme of running this type of lottery on a long-term basis. The remote chance of this occurring may also be hedged by an appropriate insurance policy.

The foregoing example suggests an allocation of 10% for Pool 2, 85% for Pool 3, and 5% for Pool 4, but these numbers may be varied as noted above depending upon pool administrator decisions. For example, Pool 3 might be varied between 50% to 95% while Pool 4 might be varied between 1% and 10% and Pool 2 may be varied between 5% and 40%. These numbers can vary considerably even beyond these ranges, but any allocation selected should include an arrangement in which the Pool 4 is a small fraction of either or both of Pools 2 and 3.

It has been found that lottery players prefer to have a money award rather than free tickets and for that reason the award of a free ticket to a pool 1 winner may be varied. In this instance, instead of awarding a free ticket to a pool 1 winner, the lottery may choose to award a dollar or an amount equivalent to the cost of the original ticket. Even though this variation on the lottery game involves additional cash payout to the lottery player, the amount involved is usually, as a practical matter, small. In the example given, on average 10% of the players would, under these conditions, win $1. However, as a practical matter, these players will ordinarily use the $1 won to purchase another ticket. This, in effect, would be the same as giving a free ticket. It is estimated that well over half and perhaps as much as 80% to 90% of those playing in these games would simply purchase a new ticket with the $1 rather than not play again.

In the playing of this game, tickets are sold or otherwise disposed of having a sequence of ten numbers arranged in four groups successively, of a single number, two numbers, three numbers and four numbers. Conveniently, these may be sold on a lottery ticket as shown in FIG. 1 in which the numbers are digits with ten digits arranged in four lines successfully consisting of one digit, two digits, three digits, and four digits. As is conventional, any number of lottery tickets may be sold. Since there are ten successive digits including zero, there are ten billion possible combinations from 0,000,000,000 to 9,999,999,999 of single digit numbers. Since Line one consists of a single digit from zero to nine, there are only ten possible combinations of Line one. There are, however, a thousand possible combinations of lines one and two consisting of three digits with any of the digits comprising a number from zero to nine. In Line three, there are three added digits, with each selected from a number from zero to nine. Thus, the possible combinations of numbers in lines one through three inclusive is one million. With the addition of four numbers in line four, there is a possible combination of 10 billion numbers.

The odds, therefore, of picking all ten numbers is quite small. However, the odds of picking the number in line 1 is 1 in 10 while the odds of picking the numbers in the first two lines are 1 in 1,000; the first three lines are 1 in 1,000,000; and first four lines 1 in 10,000,000,000.

Because of the very long odds against winning Pool 4, 1 in 10 billion, it is likely there is not going to be a winner in Pool 4 for many drawings. A great number of tickets will likely have been sold before Pool 4 is won. Accordingly, the Pool 4 money will grow over a period of time even though prizes are being won on Pools 1, 2 and 3. Thus, for example, after a period of one year or so of weekly drawings with no winners of Pool 4, the money in Pool 4 will likely exceed all the other pools and more likely than not by a very significant amount. For example, if there were no winners of Pool 4 and sales were consistent for 50 weeks, the Pool 4 money in a drawing of about 50 weeks later would likely be at least in the order of 3 times the size of Pool 3 with the allocations indicated.

It is clear by varying the percentages and charges for tickets, these numbers can change radically over a time period. In the unlikely event that there is a winner of Pool 4 when that Pool is smaller than one of the other Pools, providing a rule of pre-emption of a Pool 4 winner for any other prize will assure the Pool 4 winner of receiving maximum money. Other possible additional compensations are contemplated as, for example, providing extra tickets to a Pool 4 winner in the event the Pool 4 winner's pot is smaller than the others.

In the event that Pool 4 becomes grossly large and there are no winners for a prolonged period of time, the lottery rules may provide for the introduction of a wild number. In this arrangement, at periodic times as, for example, once a year, the lottery rules may provide that lottery ticket buyers are permitted to substitute any number in line 4 for any other number. Thus, the holder of a ticket that corresponds in all respects with the winning numbers, except for a single number in line 4, may be deemed a winner. This, in effect, reduces line 4 numbers to three numbers and thereby reduces the odds of winning from 10 billion to 1 billion. Obviously additional rules may provide for cutting the required numbers in line 4 to a lesser number such as 2 or providing a wild number that can be used in any line. The use of one or more wild numbers may be subject to other conditions. For example, a wild number might be used only to complete Line three or Line four. Ordinarily, a wild number should not be used to substitute for the first line since that would permit each individual ticket holder to be a winner. In one exception, a substitution in line one or line two might be accepted, but only if it is to complete a winning number of all four lines.

In the arrangements illustrated, the lottery tickets are arranged in a pyramid for visual interest. It should be understood, in fact, the pyramid is really a sequence of numbers arranged in groups. The numbers are all single digits in this embodiment with the digits increasing by 1 from Line 1 to Line 4.

Another embodiment of the invention is also illustrated by FIG. 1. In this embodiment, ten digits are selected randomly and these ten digits may be allocated by the players to the tickets they hold to determine whether they are a winner and, if so, the level of winning. Thus, if a player holds a ticket with the sequence 0, 1, 2, 3, 4, 5, 6, 7, 8, and 9 and the ten digits randomly selected were 2, 4, 4, 8, 9, 9, 1, 0, 0, 2, the player would be able to allocate numbers 0, 1, and 2 to be a winner of line 2, but since the randomly selected numbers did not include a '5,' the ticket would not be eligible for a Line 3 or 4 Pool award.

In some instances, a lottery administration may conclude the growth of pool 4 is not fast enough, particularly early on during the initial drawings. In such case, the lottery rules may provide for a split among pools of the lottery money in which the percentage allocated to pool 4 is greater than one or more of the other pools. When the amount has reached an appropriate sum in pool 4 the percentage allocations thereafter may revert to percentages as set forth above.

Figure 2:
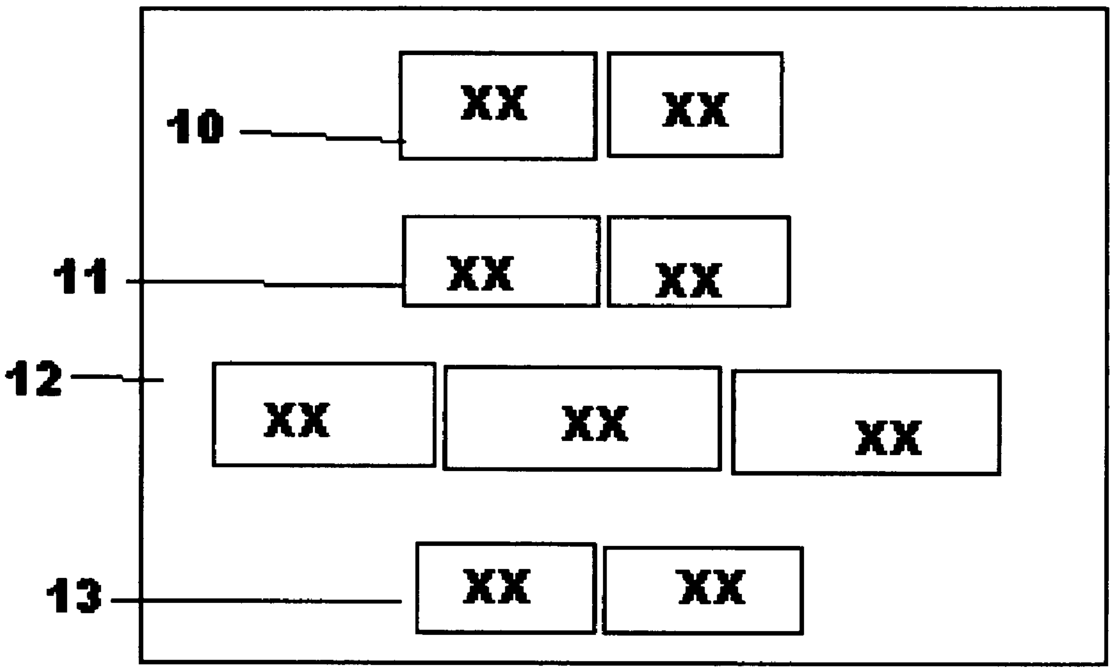
FIG. 2 is illustrative of an alternative numbering arrangement used in this invention.

The invention also contemplates providing a lottery ticket in which "N" numbers are grouped in a series of successive groups "S" of digits in which successive groups of digits may consist of any number of digits. Thus, for example, the invention contemplates a series of groups of numbers illustrated in FIG. 2 in which there are lines shown at 10, 11, 12, and 13. Line 10 may consist of any two numbers with each having two digits illustrated by the letters XX. Line 11 also has numbers with each having two digits XX. Line 12 consists of three numbers with each having two digits XX and Line 13 of one numbered two digit XX. In this arrangement, the lottery money pool is derived from sale of lottery tickets. Varying percentages of the money pool allocated may be provided in which the larger total percentage of the money pool is allocated among the first three lines 10, 11 and 12 and a very small percentage to lines 10 to 13. Thus, for example, 2% may be allocated to line 10, 10% to lines 10 and 11, 85% to lines 10 to 12, and 3% to lines 10 to 13. A winner of line 10 is required to pick the two numbers of line 10. The winner in line 11 is required to pick the winning numbers in lines 10 and 11. The winner in line 12 is required to pick the winning numbers of lines 10, 11 and 12. Whereas, a winner in line 13 is required to pick the numbers of lines 10 to 13 inclusive and has the option of switching with any other pool. Thus numbers other than from 0 to 99 may be used, as for example numbers from 0 to 50 may be used for XX. The key to this arrangement, similar to other embodiments, requires that the most difficult combination to win have allocated to its pool a smaller percentage of total Pool money than other Pools, and further the Pool money be carried over from one Pool to the next or at least a portion of that money be carried over from one pool to the next in the event there is no winner in the periodic drawing. While the invention contemplates use of numbers other than digits in this embodiment, the practical probabilities of winning suggest limiting the numbers to digits is most practical.

Many lottery players are keenly interested in the actual drawing process which is frequently aired on television as a regular program. These players are quite interested in the suspense of the drawing and are very interested in having a continuing chance of winning some sort of award. It is for that reason that many games draw numbers and award prizes on a non-exact selection. Consequently, the concept of exact and non-exact selection of numbers becomes relevant in many games. In the present game, a non-exact drawing is obviously possible involving ten digits. This, however, would radically increase the likelihood of winning and for that reason would be a deterrent to some of the objectives that an exact game involves. Under these conditions, the lottery administration may decide to combine exact and non-exact features of the game. For example, the first six numbers may be drawn and applied to lines 1-3 in any order chosen by the player, while line 4 would be an exact order number. This would obviously increase the likelihood of winning Pools 1, 2 and 3, but would allow a much more difficult or lower chance of winning the Pool 4 prize. A further variant that is contemplated would be to permit a non-exact order of lines 2 and 3 and not lines 1 and 4. Obviously if a non-exact order of line 1 and another line were combined, the likelihood of individuals getting a free ticket would be materially enhanced. For that reason, if a non-exact order is to be included in a particular game, it should be limited to one or more of a combination of lines 2, 3 and 4, with the non-exact order of line 4 not being recommended if the maximum objectives of the invention are to be achieved.

Figure 3:
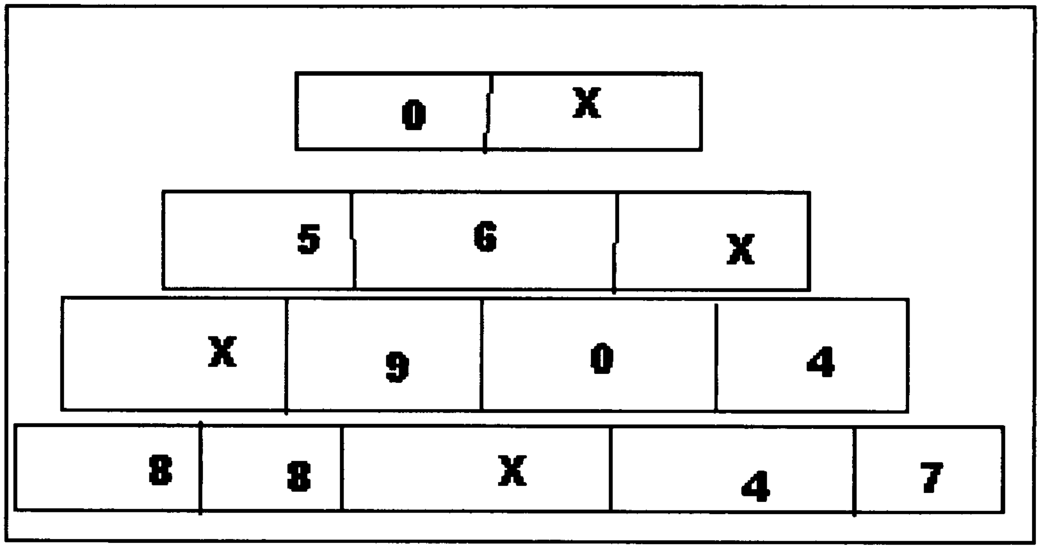
FIG. 3 is a schematic illustration of the still further embodiment of the present invention.

In FIG. 3, there is illustrated a further embodiment in which there are arranged four lines successively of two digits, three digits, four digits, and five digits. The procedures and arrangements for this game are similar to those previously discussed. In this instance, however, there are a total of fourteen digits that would have to be picked to win the lottery. Under those conditions, the likelihood of picking fourteen digits is astronomically small and is 1 in 100 trillion. Since these odds would be too great for any practical lottery usage, a drawing based solely upon the drawing fourteen numbers is not practical. Instead, this invention contemplates reducing the odds of selecting all numbers by use of one or more wild numbers. In short, a variety of combinations of wild numbers may be picked. For example, the player may be given the option of selecting four wild numbers. The rules may permit the use of one wild number per line, or even as many as all four wild numbers in either the third or fourth line. A variety of combinations is obviously possible. In addition to providing a lottery game with wild numbers as suggested in the preceding sentence, the game may also provide for increased winning odds for the fewer wild numbers selected. In short, if a player does not use any wild numbers, the payout may be increased appropriately.

In an example shown in FIG. 3, the game provides for one wild number per line with the wild number identified by the "X." In this case, the player will be deemed to have the correct number in those locations marked with an "X."

Figure 4:
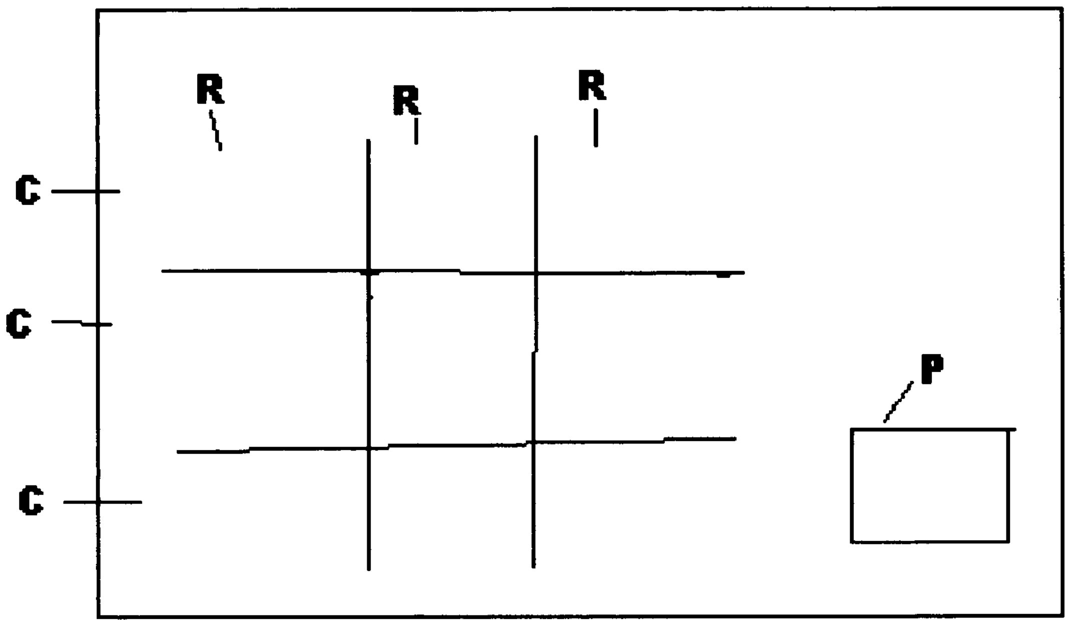
FIG. 4 is an illustration of a further embodiment of the present invention.

In FIG. 4 is illustrated a still further embodiment of the present invention. In this embodiment a matrix of rows R and columns C are configured. In the particular embodiment illustrated there are three rows and three columns. The other variants are contemplated, including, as an example, a matrix of three columns and four rows. In addition to the matrix illustrated in FIG. 4 of three columns and three rows there is an added block for one additional digit P. When tickets are sold as described above, each of the squares forming the matrix and the additional block P are filled by the player with digits from zero to nine. Thus, in the embodiment illustrated, there will be ten digits including nine within the matrix of three rows and three columns plus a single digit in the matrix identified at P.

Tickets are sold with numbers selected by the customer and inserted into each of the squares. As previously noted, the preferred embodiment of the invention contemplates the use of digits from zero to nine.

Each weekly drawing numbers sufficient to fill the matrix and box P as shown on FIG. 4 are drawn. These may be drawn in a variety of fashions as further described herein. The winning number is thus selected, which in the embodiment of FIG. 4 is ten digits long. In this matrix of nine numbers plus box P, a convention must be established for determining the location in the matrix of the numbers selected for uniform playing of the lottery. For example, the ten numbers selected may be allocated successively to each row from the top down, with each row filled from left to right, and then the tenth number is allocated to the additional digit P. Other orders are possible.

The pool is allocated among the winning combinations. The winning pool numbers may comprise any row, any column or either diagonal of three digits. Prize money is allocated among those selecting a winning number combination. Obviously a winning ticket may have more than one winning combination of numbers. For example, a single ticket may have selected the correct numbers in a single row and in a single column. In fact, a single ticket may have one, two, three, four, five, six or eight possible combinations of three straight numbers. Prizes may be awarded for any one of these number groups, alone or in combination with selection of the digit P. In the specific embodiment of FIG. 4 a variety of allocations from pools to various winning combinations may be selected, provided however, and consistent with the other embodiments, the portion of the pool allocated to tickets selecting all ten winning numbers would a smaller sum of the whole pool, e.g. 9 percent, with 91 percent being divided among winners of pool combinations of less than all of the numbers. Thus, for example, winners in this game may be individuals who pick the three numbers in any column or row or diagonal. Thus, for example, 13 percent of the 91 percent of the pool may be allocated to individuals picking a set of three numbers in any single row, column or diagonal. An additional percent may be allocated to winners picking two sets of rows, columns or diagonal numbers in a row. A third percent may be allocated to those individuals picking four sets of three numbers in a row, column or diagonal, and so forth. If 9% of the pool is allocated to the tickets selecting all ten digits, the pool balance may be divided into seven groups of 13% of the pool for winners selecting less than all the numbers. Each 13% pool would then be allocated among those winning the corresponding groups of winning numbers.

Also contemplated is a lottery game in which the rules of the drawing vary depending upon the pools involved. For example, if the pools reach significant sums as, for example, the Pool 4 sum reaches $250 million, the lottery rules might provide that the Pool 4 line would be in a non-exact order, thus materially improving the odds of a winning Pool 4. This, of course, may be an alternative to using a wild card or joker system.

Turning now to the perception of game contestants at the time of the drawing. There is a perceived interest that lottery game viewers of the television drawing want to see some suspense. In this game, some suspense may be achieved by one of several methods. In one embodiment, the selected numbers in the drawing may be drawn in a reverse order. That is, the drawing of the various numbers may start with line 4, then line 3, then line 2, and finally line 1. The particular order within a line may also be varied, as for example the $10^{th}$ number first, then the $9^{th}$, then the $8^{th}$ and the like until the first number is selected. If this method is followed, there will be many people who will immediately realize they are not winning the grand prize, but that does not preclude them from winning Pool 3 even though they did not choose the winning combination number of line 4. They would have to wait until the numbers of line 3 are chosen to know whether they were still in the running to win pool 3. Similarly, the drawings of line 2 numbers would have to be complete before a person would know whether they were still in the running for winning pool 2 and finally line 1 would have to be drawn before all of the winners were known.

As an alternative to this drawing process, the drawings may be conducted in a two stage process. First, all ten numbers to be filled in on the triangle may be selected in no particular order. In short, there would be ten digits picked. These ten digits would then be subject to a second drawing in which the order of insertion in the pyramid would be selected. The suspense may be further enhanced by selecting these numbers randomly or in a reverse order starting with line 4, then line 3, then line 2, and finally line 1. In this fashion, there is maximum suspense to the viewers. All this procedure may be further enhanced by computer calculations as to the approximate odds remaining of people winning with these approximate odds being displayed in a separate calculation as the drawing progresses. These features allow for a rather suspenseful entertainment of television presentation and would allow for an interesting programming sequence in which the two drawings would be separated to allow some advertising time on the program.

Having now declared my invention, I claim:

1. An online lottery game having periodic drawings of a series of "N" numbers, comprising selling lottery tickets for money to lottery customers in one of a successive series of lottery sales periods, said lottery tickets each bearing "N" numbers, allocating at least a portion of the money derived from lottery ticket sales into a plurality of money pools with the money allocated to one pool smaller than the money allocated to at least one other pool, at the end of the lottery sales period randomly selecting a series of "N" numbers constituting the winning numbers, thereafter awarding the said one pool to be divided among lottery customers who selected all of the "N" numbers and the said one other pool to be awarded among lottery customers who selected fewer than the "N" numbers and thereafter allocating at least a portion of any money not awarded to the respective same pool to which it had been originally allocated for a possible award in the next of the successive lottery sales periods.

2. A lottery game as set forth in claim 1 wherein each number is a digit from 0 to 9.

3. A lottery game as set forth in claim 1 wherein "N" equals ten, and the fewer than "N" numbers include three groups of numbers include three groups of numbers comprising respectively:

group 1 is the first number, group 2 is the first three numbers, and group 3 is the first six numbers.

4. A lottery game as set forth in claim 3 wherein the lottery customers may, in a pre-selected lottery sales period, substitute a number on that lottery customer's ticket with the corresponding number in the winning number.

5. A lottery game as set forth in claim 3 wherein the one pool is allocated to the winners, if any, who chose all "N" numbers, and the one other pool is allocated to the winners, if any, of group three.

6. A lottery game as set forth in claim 5 wherein free tickets for a subsequent lottery sales period are awarded to the winners of group one.

7. A lottery game as set forth in claim 3 wherein the winners, if any, of group one are each awarded a fixed sum of money.

8. A lottery game as set forth in claim 3 wherein each number is a digit selected from the group 0 to 9.

9. A lottery game as set forth in claim 8 wherein the lottery customers may, in a pre-selected sales period, substitute a number on that lottery customer's ticket with a corresponding winning number selected from groups 2 and 3.

10. A lottery game as set forth in claim 3 wherein the "N" numbers are sequentially selected and are first allocated to groups other than group one with the allocation to group one occurring last.

11. A lottery game as set forth in claim 10 wherein each number is a digit.

12. A method of participating in an online lottery game comprising purchasing one or more lottery tickets in a sales period, said one or more lottery tickets each having "N" numbers with each of the "N" numbers selected by or on the authorization of the ticket purchaser, allocating at least a portion of the money derived from lottery ticket sales into a plurality of money pools with each money pool allocated to different groups of the "N" numbers and with the money in the money pools allocated to the money pool with the largest group of the "N" numbers smaller than the money allocated to at least one other money pool, at the end of the lottery sales period randomly selecting a series of numbers constituting the winning numbers, thereafter awarding the money in the said pools to be divided among lottery customers who selected all of the winning numbers in the pool with the largest group of "N" numbers and the said at least one other pool to be awarded among lottery customers who selected winning numbers within each of the other preselected groups and thereafter allocating at least a portion of any money not awarded to the respective same pool to which it had been originally allocated for a possible award into the next of the successive lottery sales periods.

* * * * *